United States Patent
Hsieh et al.

(10) Patent No.: US 11,910,103 B2
(45) Date of Patent: Feb. 20, 2024

(54) ELECTRONIC SYSTEM AND IMAGE AGGREGATION METHOD THEREOF

(71) Applicant: eYs3D Microelectronics, Co., Taipei (TW)

(72) Inventors: Hong-Yeh Hsieh, Taipei (TW); Ming-Hua Lin, Taipei (TW)

(73) Assignee: EYS3D MICROELECTRONICS, CO., Taipei (TW)

( * ) Notice: Subject to any disclaimer, the term of this patent is extended or adjusted under 35 U.S.C. 154(b) by 163 days.

(21) Appl. No.: 17/386,070

(22) Filed: Jul. 27, 2021

(65) Prior Publication Data

US 2022/0038624 A1 Feb. 3, 2022

Related U.S. Application Data

(60) Provisional application No. 63/057,306, filed on Jul. 28, 2020.

(30) Foreign Application Priority Data

Jul. 23, 2021 (TW) .................................. 110127243

(51) Int. Cl.
*H04N 23/80* (2023.01)
*H04N 5/262* (2006.01)
(Continued)

(52) U.S. Cl.
CPC ........... *H04N 23/80* (2023.01); *H04N 1/2141* (2013.01); *H04N 5/2628* (2013.01); *H04N 23/6845* (2023.01); *H04N 23/90* (2023.01)

(58) Field of Classification Search
CPC .. H04N 23/80; H04N 23/6845; H04N 23/662; H04N 1/2141; H04N 23/90;
(Continued)

(56) References Cited

U.S. PATENT DOCUMENTS

2002/0145752 A1\* 10/2002 Hanabusa .......... H04N 1/00145
358/1.15
2006/0280496 A1\* 12/2006 Tanoue .............. H04N 1/00129
386/E5.072
(Continued)

FOREIGN PATENT DOCUMENTS

TW 201915782 A 4/2019

OTHER PUBLICATIONS

Communication corresponding to Taiwan Application No. 110127243 and issued by Taiwan Intellectual Property Office dated Jun. 27, 2022, 5 pages.

*Primary Examiner* — Pritham D Prabhakher
(74) *Attorney, Agent, or Firm* — Innovation Counsel LLP

(57) ABSTRACT

The application provides an electronic system and an image aggregation method thereof. The electronic system includes a plurality of image pickup devices and an image aggregation device coupled to the image pickup devices. The image aggregation device controls trigger of the image pickup devices. When the image pickup devices are triggered, the image pickup devices pickup a plurality of images and send to the image aggregation device. The image aggregation device flexibly selects the images pickup by the image pickup devices to flexibly aggregate into an aggregated image.

22 Claims, 11 Drawing Sheets

(51) Int. Cl.
*H04N 1/21* (2006.01)
*H04N 23/90* (2023.01)
*H04N 23/68* (2023.01)

(58) Field of Classification Search
CPC .......... H04N 5/06; H04N 5/2628; H04N 5/77; H04N 5/262; G11B 27/031
USPC ...................................................... 348/222.1
See application file for complete search history.

(56) References Cited

U.S. PATENT DOCUMENTS

| | | | |
|---|---|---|---|
| 2017/0078646 A1* | 3/2017 | Matsunobu | H04N 23/90 |
| 2018/0150930 A1* | 5/2018 | Ozawa | H04L 65/75 |
| 2019/0379917 A1* | 12/2019 | Sugio | H04N 21/23439 |
| 2020/0213631 A1* | 7/2020 | Jung | H04N 21/4728 |
| 2022/0006922 A1* | 1/2022 | Bathija | H04N 23/661 |
| 2022/0006945 A1* | 1/2022 | Bathija | H04N 23/90 |
| 2022/0006962 A1* | 1/2022 | Bathija | G05D 1/104 |
| 2022/0094862 A1* | 3/2022 | Jung | H04N 25/46 |
| 2022/0239513 A1* | 7/2022 | Swierk | G06V 40/18 |
| 2023/0298300 A1* | 9/2023 | He | G06V 10/25 |
| | | | 348/77 |

* cited by examiner

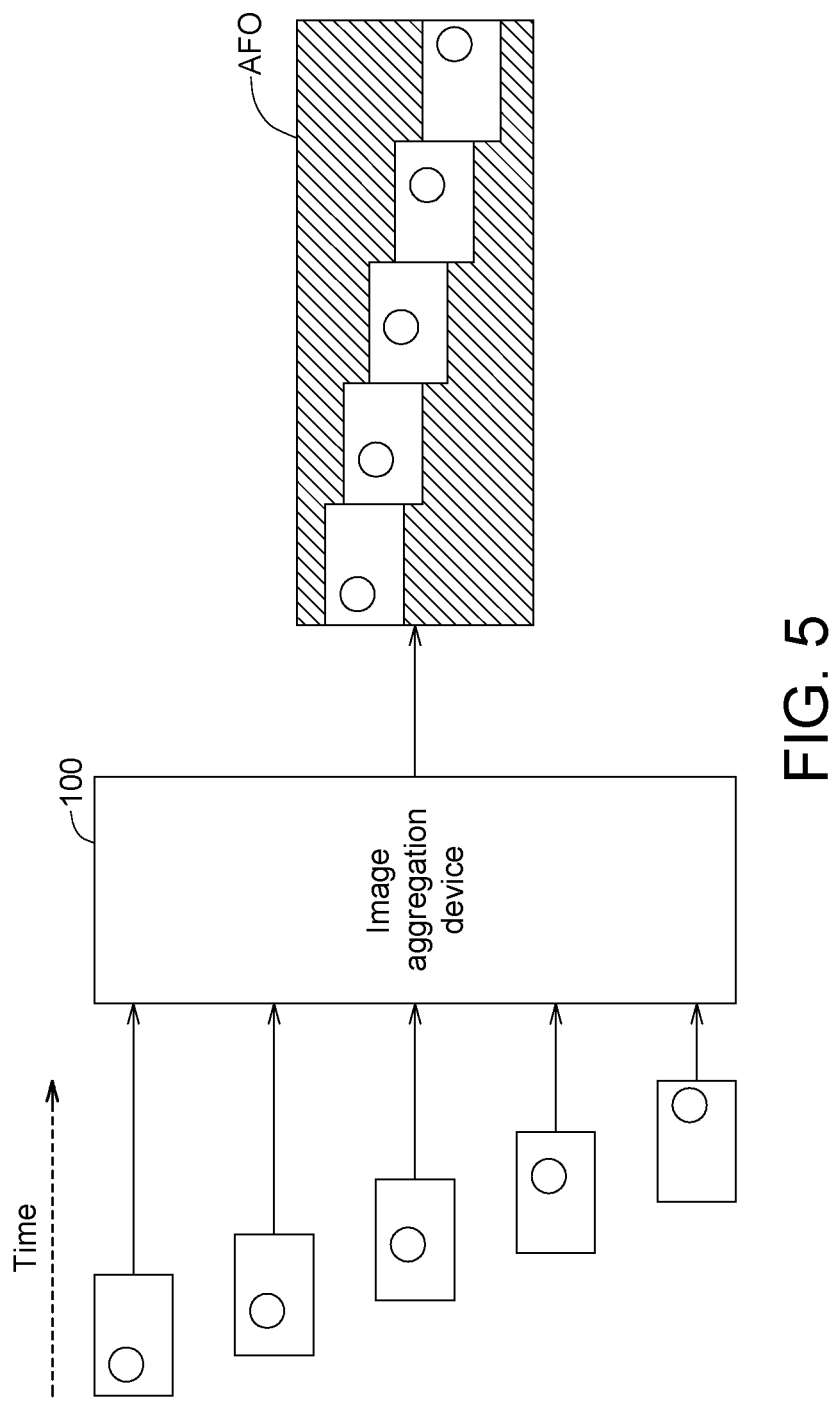

ELECTRONIC SYSTEM AND IMAGE AGGREGATION METHOD THEREOF

This application claims the benefit of U.S. provisional patent application Ser. No. 63/057,306, filed Jul. 28, 2020 and the benefit of Taiwan application Serial No. 110127243, filed Jul. 23, 2021, the subject matter of which are incorporated herein by reference.

FIELD OF THE INVENTION

The invention relates in general to an electronic system and an image aggregation method thereof.

DESCRIPTION OF THE RELATED ART

For safety consideration, currently many places (such as buildings or streets) are installed with monitoring systems. FIG. 1A and FIG. 1B are schematical diagrams of two conventional monitoring systems. As indicated in FIG. 1A, image pickup devices 1_0~1_N (N is a positive integer) are coupled to a central server 2, which is further coupled to clients 3_0~3_M (M is a positive integer). As indicated in FIG. 1B, image pickup devices 4_0~4_N are coupled to system-on-chips (SOC) 5_0~5_N; the system-on-chips 5_0~5_N and the clients 8_0~8_M are connected to a central server 7 through a network 6.

Conventional monitoring systems need to be installed with a central server. As indicated in FIG. 1A and FIG. 1B, the image pickup devices 1_0~1_N/4_0~4_N of a conventional monitoring system can pick up and compress image data, and then store the compressed image data to the hard disc of the central server 2/7. The apps of the clients 3_0~3_M/8_0~8_M can pick up image data from the hard disc of the central server 2/7, compress the picked-up image data and then play back the compressed image data. The central server 2/7 of a conventional monitoring system need to be provided with high calculation ability and a hard disc with large capacity, and therefore incur higher cost.

Besides, since conventional monitoring systems are unable to perform "automatic selection/manual selection/flexible selection" on the pickup images of several image pickup devices, aggregate the selected images as an image and then output the aggregated image to the client, the application scope of conventional monitoring systems is limited.

The number of the image pickup devices that can be installed in a conventional monitoring system is subjected to the number of channels of the central server and cannot be easily expanded, making it difficult to flexibly expand the number of the image pickup devices and/or change the positions of the image pickup devices.

Additionally, head mounted devices with virtual reality/augmented reality (VR/AR) function have gradually attracted people's attention. Conventional head mounted devices with AR/VR function can pick up external images and then display the pickup images on the screen for the user to view.

However, conventional head mounted devices with AR/VR function are unable to effectively increase the frame rate, and their object tracking function and/or dynamic trajectory detection function still need to be improved.

Moreover, conventional head mounted devices with AR/VR function cannot make reference to the information of dynamic trajectory, and therefore cannot effectively detect the moving path of the object or predict the direction of the motion of the head or object, nor pick up and display the image in the predicted direction. Therefore, when the user wearing a conventional AR/VR head mounted device quickly turns his/her head to track a moving object, the user will feel dizzy due to visual persistence and fast head swing.

SUMMARY OF THE INVENTION

The invention is directed to an electronic system and an image aggregation method thereof capable of achieving flexible image aggregation in a multi-input and multi-output manner.

According to a first aspect of the present invention, an electronic system is provided. The electronic system includes a plurality of image pickup devices and an image aggregation device coupled to the image pickup devices for controlling triggering of the image pickup devices. When the image pickup devices are triggered, the image pickup devices pick up and send a plurality of images to the image aggregation device. The image aggregation device flexibly selects required images from the pickup images of the image pickup devices and flexibly rearranges the selected images as an aggregated image.

In an embodiment of the present invention, the image aggregation device flexibly and repeatedly use the pickup images of the image pickup devices according to the size of an internal buffer.

In an embodiment of the present invention, the image aggregation device includes a trigger control unit, an interface circuit, a write circuit and a retiming circuit. The trigger control unit is coupled to the image pickup devices for controlling triggering of the image pickup devices. The interface circuit is coupled to the image pickup devices and the trigger control unit, wherein when the image pickup devices are triggered, the pickup images of the image pickup devices are sent to the interface circuit, which then decodes the pickup images of the image pickup devices to generate a sync signal and a video streaming and further sends the sync signal to the trigger control unit. The write circuit is coupled to the interface circuit for receiving the video streaming obtained by the interface circuit through decoding; a storage unit coupled to the write circuit for storing the video streaming written by the write circuit. The retiming circuit is coupled to the storage unit for flexibly rearranging the video streaming read from the storage unit as the aggregated image.

In an embodiment of the present invention, the interface circuit adjusts the frame size of the images.

In an embodiment of the present invention, the write circuit writes the video streaming to the storage unit according to a raster scan sequence.

In an embodiment of the present invention, the storage unit includes a plurality of line buffers or includes a frame buffer; wherein, when the storage unit includes the line buffers, the size of the storage unit is relevant to a number of the image pickup devices, an image width of the pickup image and the image pixel bit number of the pickup image.

In an embodiment of the present invention, the retiming circuit includes a plurality of retiming units, each including a storage control unit, a read unit and a frame control unit, wherein, when an image data of the storage unit is ready, the storage control unit notifies the read unit to read the storage unit according to a scheduling queue parameter, which is set by the user; the scheduling queue parameter flexibly selects required images from the pickup images of the image pickup devices for image aggregation, and flexibly designates an image aggregation sequence.

In an embodiment of the present invention, in response to the notification of the storage control unit, the read unit reads the video streaming from the storage unit and then sends the video streaming read to the storage control unit; and the storage control unit sends the video streaming to the frame control unit; and the frame control unit flexibly rearranges the video streaming received from the storage control unit to generate the aggregated image.

In an embodiment of the present invention, the trigger control unit generates a plurality of trigger signals to the image pickup devices for controlling the image pickup of the image pickup devices and an image output timing, wherein the trigger signals of the image pickup devices are mutually independent.

In an embodiment of the present invention, the trigger control unit selects one of the image pickup devices as a reference image pickup device, and triggering of each of other non-reference image pickup devices of the image pickup devices is delayed in comparison to triggering of the reference image pickup device.

In an embodiment of the present invention, the trigger control unit includes a multiplexer, a timing calculation unit and a delay control unit, which includes a plurality of delay control units, wherein the multiplexer is coupled to the interface circuit for sending the sync signal of the reference image pickup device to the timing calculation unit; the timing calculation unit performs timing calculation; and the delay control units count individual delay time of each of the image pickup devices to trigger the image pickup devices according to a delay time parameter.

According to a second aspect of the present invention, an image aggregation method is provided. The method includes: controlling triggering of a plurality of image pickup devices; when the image pickup devices are triggered, picking up a plurality of images by the image pickup devices; and flexibly selecting the pickup images of the image pickup devices and flexibly rearranging the selected images as an aggregated image.

In an embodiment of the present invention, the pickup images of the image pickup devices are flexibly and repeatedly used according to the size of an internal buffer.

In an embodiment of the present invention, the pickup images of the image pickup devices are decoded to generate a sync signal and a video streaming; the video streaming are stored to a storage unit; and the video streaming read from the storage unit is rearranged as an aggregated image.

In an embodiment of the present invention, the frame size of the images is adjusted.

In an embodiment of the present invention, the video streaming is written to the storage unit according to a raster scan sequence.

In an embodiment of the present invention, the storage unit includes a plurality of line buffers or includes a frame buffer; wherein, when the storage unit includes the line buffers, the size of the storage unit is relevant to a number of the image pickup devices, an image width of the pickup image and the image pixel bit number of the pickup image.

In an embodiment of the present invention, when an image data of the storage unit is ready, the storage unit is read according to a scheduling queue parameter, which is set by the user; the scheduling queue parameter flexibly selects required images from the pickup images of the image pickup devices for image aggregation, and flexibly designates an image aggregation sequence.

In an embodiment of the present invention, a plurality of trigger signals are generated to the image pickup devices for controlling the image pickup of the image pickup devices and an image output timing, wherein the trigger signals of the image pickup devices are mutually independent.

In an embodiment of the present invention, one of the image pickup devices is selected as a reference image pickup device, and triggering of each of other non-reference image pickup devices of the image pickup devices is delayed in comparison to triggering of the reference image pickup device.

In an embodiment of the present invention, timing calculation is performed according to the sync signal of the reference image pickup device; and individual delay time of each of the image pickup devices is counted to trigger the image pickup devices according to a delay time parameter.

According to a third aspect of the present invention, an electronic system is provided. The electronic system includes a plurality of image pickup devices and an image aggregation device. The image aggregation device is coupled to the image pickup devices for controlling triggering of the image pickup devices, wherein when the image pickup devices are triggered, the image pickup devices pick up and send a plurality of images to the image aggregation device, the image aggregation device flexibly selects required images from the pickup images of the image pickup devices and flexibly rearranges the selected images as one or more than one aggregated image.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 5 is an example of image aggregation according to an embodiment of the present invention.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present invention.

Figure 1A:
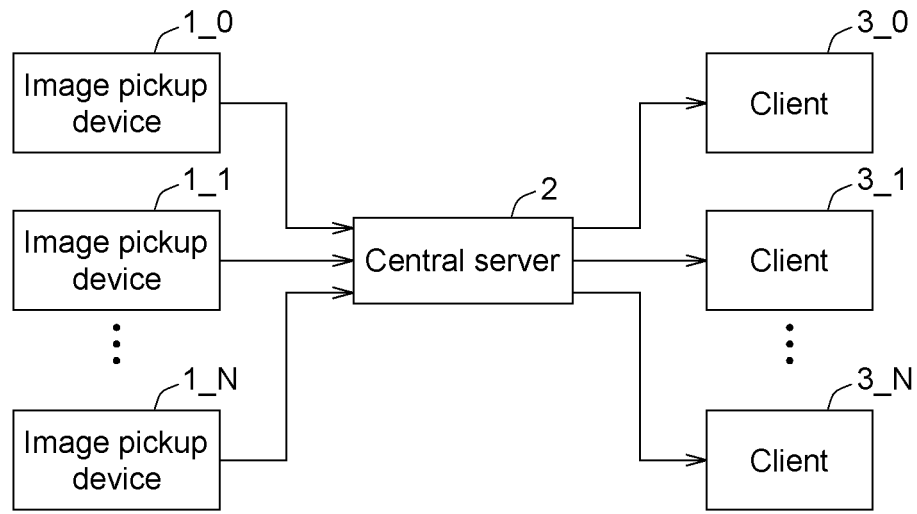
FIG. 1A (prior art) and FIG. 1B (prior art) are schematic diagrams of two conventional monitoring systems.
Figure 1B:
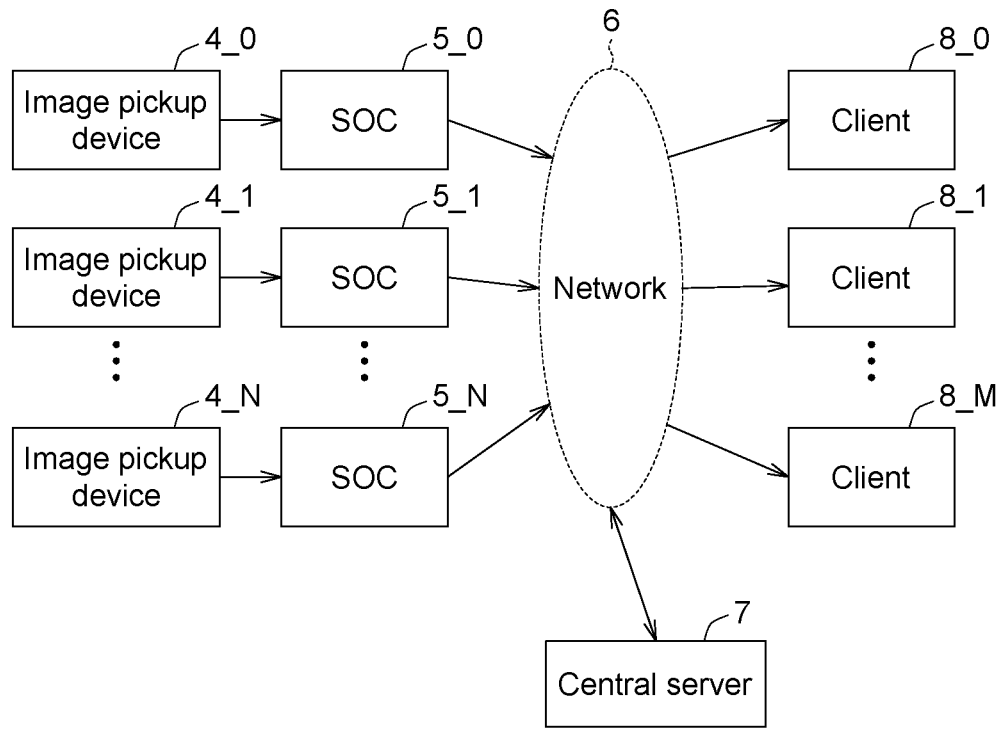
Figure 2A:
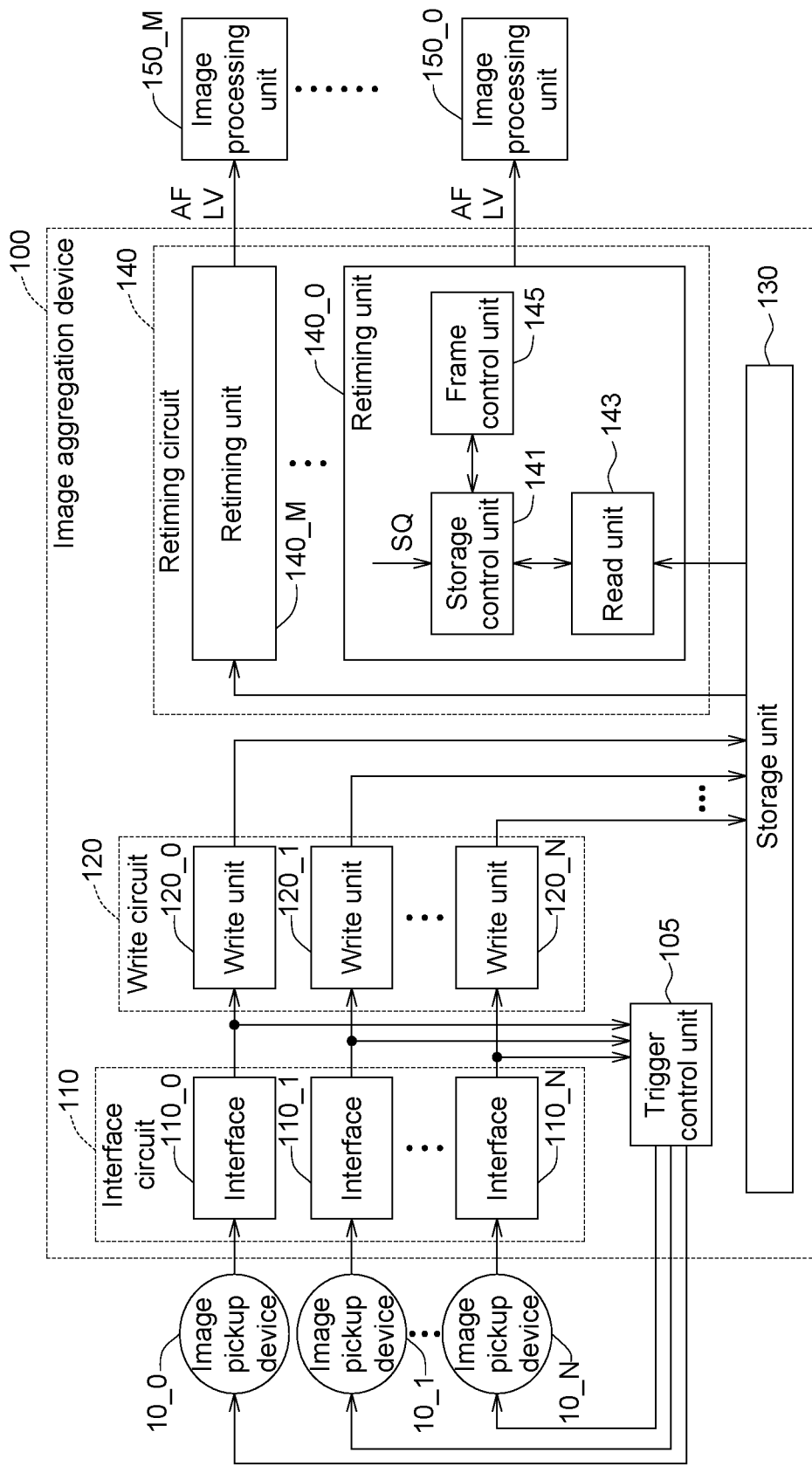
FIG. 2A is a functional block diagram of an image aggregation device according to an embodiment of the present invention.

Referring to FIG. 2A, a functional block diagram of an image aggregation device according to an embodiment of the present invention is shown. According to an embodiment of the present invention, the image aggregation device 100 includes a trigger control unit 105, an interface circuit 110, a write circuit 120, a storage unit 130 and a retiming circuit 140. The image aggregation device 100 selects required images from the pickup images of a plurality of pickup images of a plurality of image pickup devices 10_0~10_N (N is a positive integer) and then aggregates the selected images. Here, the image pickup devices 10_0~10_N complementary metal-oxide-semiconductor (CMOS) can be realized by an image sensor but is not limited thereto.

The trigger control unit 105 is coupled to the image pickup devices 10_0~10_N for controlling triggering of the image pickup devices 10_0~10_N. When the image pickup devices 10_0~10_N are triggered by the control unit 105, the image pickup devices 10_0~10_N pick up images and send the pickup images to the interface circuit 110. Details of the trigger control unit 105 are disclosed below. In other possible embodiments of the present invention, if the image pickup devices 10_0~10_N have master-slave function, the image pickup devices can be connected in series, wherein one of the image pickup devices is the master image pickup device and the other image pickup devices are slave image pickup devices. When the image pickup devices 10_0~10_N are triggered, the trigger control unit 105 sends the trigger signal to the master image pickup device, which then sends the trigger signal to the slave image pickup devices stage by stage.

The interface circuit 110 is coupled to the image pickup devices 10_0~10_N and the trigger control unit 105. The interface circuit 110 includes a plurality of interfaces 110_0~110_N respectively coupled to the image pickup devices 10_0~10_N. The interfaces 110_0~110_N perform image windowing (for example, extract a region of interest (ROI) from a complete image) and decode the video streaming picked up by the image pickup devices 10_0~10_N, send the sync signal obtained through decoding to the trigger control unit 105 and the write circuit 120. To meet the user's needs, the interface circuit 110 also can adjust the frame size of the video streaming picked up by the image pickup devices 10_0~10_N.

The write circuit 120 is coupled to the interface circuit 110 for writing the video streaming obtained by the interface circuit 110 through decoding to the storage unit 130. The write circuit 120 includes write units 120_0~120_N. In an embodiment of the present invention, illustratively but not restrictively, the write units 120_0~120_N of the write circuit 120 write the video streaming obtained by the interface 110_0~110_N through decoding to the storage unit 130 according to a raster scan sequence.

The storage unit 130 is coupled to the write circuit 120 for receiving the video streaming written by the write circuit 120. In an embodiment of the present invention, the storage unit 130 includes a plurality of line buffers to save cost. Under such circumstances, after the video streaming picked up by the image pickup devices 10_0~10_N is read by the retiming circuit 140, the video streaming will shortly be overwritten by subsequent video streaming and therefore cannot be repeatedly used by the retiming circuit 140. When the storage unit 130 includes a plurality of line buffers, the size of the storage unit 130 can be represented as: (N+1)*W*1.5*B, wherein, (N+1) represents the number of the image pickup devices; W represents the image width of the pickup images of the image pickup device; B represents the image pixel bit number of the pickup image of pickup device. That is, when the storage unit 130 includes a plurality of line buffers, the size of the storage unit 130 is relevant to the number of the image pickup devices, the image width of the pickup image and the image pixel bit number of the pickup image.

Or, in another example, the storage unit 130 includes a frame buffer for increasing the performance. The video streaming picked up by the image pickup devices 10_0~10_N can be shared or repeatedly used by the retiming circuit 140.

That is, in an embodiment of the present invention, according to the size of internal buffer of the storage unit 130, the image aggregation device 100 can flexibly and repeatedly use or share the video streaming picked up by the image pickup devices 10_0~10_N.

The retiming circuit 140 is coupled to the storage unit 130. The retiming circuit 140 can rearrange the video streaming read from the storage unit 130 as an aggregated image. Illustratively but not restrictively, the aggregated image includes horizontal sync signals, vertical sync signals and pixel data.

The retiming circuit 140 includes a plurality of retiming units 140_0~140_M (M is a positive integer). Each of the retiming units 140_0~140_M includes a storage control unit 141, a read unit 143 and a frame control unit 145.

When the image data of the storage unit 130 is ready, the storage control unit 141 notifies the read unit 143 to read the storage unit 130 according to a spooling queue parameter SQ. That is, the storage control unit 141 can schedule which target images of the images (picked up by the image pickup devices 10_0~10_N) stored in the storage unit 130 to be aggregated as an image, and accordingly notify the read unit 143 to read the scheduled target images. The scheduling queue parameter SQ, set by the user (manual setting), flexibly designates the scheduling sequence of the one or more than one image pickup device. Moreover, the scheduling sequence of the designated image pickup devices can be arbitrarily arranged and are not limited to the consecutive numbering sequence of the image pickup devices, and there is no need to allocate consecutive image pickup devices to the same group. Illustratively but not restrictively, the retiming unit 140_0 can rearrange the images selected from the pickup images of the image pickup devices 10_0~10_K (K N) as a complete aggregated image. Besides, the user also can designate the scheduling queue parameter SQ, which specifies the aggregation sequence of the pickup images of the image pickup devices 10_0~10_K. Illustratively but not restrictively, in response to the scheduling queue parameter SQ, the retiming unit 140_0 can designate the aggregation sequence as: the pickup image of the image pickup device 10_2, the pickup image of the image pickup device 10_1, and the pickup image of the image pickup device 10_K, and the said arrangements are still within the spirit of the present invention. In another possible example, in response to the scheduling queue parameter SQ, the retiming unit 140_0 can designate the aggregation sequence as: the pickup image of the image pickup device 10_2, the pickup image of the image pickup device 10_4, and the pickup image of the image pickup device 10_1.

That is, in an embodiment of the present invention, the retiming circuit 140 can perform "automatic selection/manual selection/flexible selection" to flexibly automatically or manually select required images from the pickup images of the pickup images of the image pickup devices 10_0~10_N and flexibly aggregate the selected images as a complete aggregated image. Thus, the flexibility of use can be increased, and user experience can be improved.

Additionally, in another embodiment of the present invention, the retiming circuit 140 can flexibly select several images from the pickup images of the image pickup devices 10_0~10_N (that is, multi-input) and flexibly rearrange the selected images as one or more than one complete aggregated image (that is, multi-output) to achieve flexible multi-input and multi-output image aggregation. Thus, the flexibility of use can be increased, and user experience can be improved.

In response to the notification sent by the storage control unit 141, the read unit 143 reads a video streaming from the storage unit 130 and sends the read video streaming to the storage control unit 141.

The frame control unit 145 rearranges the video streaming received from the storage control unit 141 to generate an aggregated image. The aggregated image generated by the retiming units 140_0~140_M can be sent to the back-end image processing units 150_0~150_M. Here, the architecture and operations of the image processing units 150_0~150_M are not subjected to particular restrictions.

As exemplified below, the retiming unit 140_0 rearranges the pickup images of the image pickup devices 10_0~10_K (0≤K≤N), but the present invention is not limited thereto. In response to the scheduling queue parameter SQ, when the first line of the pickup image of the image pickup device 10_0 is already stored to the storage unit 130, the storage control unit 141 of the retiming unit 140_0 instructs the read unit 143 to read the first line of the pickup image of the image pickup device 10_0 from the storage unit 130 and send the first line of the pickup image of the image pickup device 10_0 to the storage control unit 141 and the frame control unit 145. By the same analogy, when the first line of the pickup image of the image pickup device 10_K is already stored to the storage unit 130, the storage control unit 141 of the retiming unit 140_0 instructs the read unit 143 to read the first line of the pickup image of the image pickup device 10_K from the storage unit 130 and send the first line of the pickup image of the image pickup device 10_K to the storage control unit 141 and the frame control unit 145. The frame control unit 145 of the retiming unit 140_0 can rearrange the first line of the pickup image of the image pickup devices 10_0~10_K respectively as the first line of a rearranged image. The above process is repeated until the frame control unit 145 rearranges the pickup images of the image pickup devices 10_0~10_K as a complete rearranged image.

The trigger control unit 105 can generate a trigger signal to relevant image pickup devices 10_0~10_N for controlling the timing of image pickup and image output of each of the image pickup devices 10_0~10_N. The trigger signal of each of the image pickup devices 10_0~10_N can be independent, therefore each of the image pickup devices 10_0~10_N can be triggered at any time point.

In an embodiment of the present invention, the trigger control unit 105 can select one of the image pickup devices 10_0~10_N as a reference image pickup device, and triggering of other non-reference image pickup device is delayed.

Figure 2B:
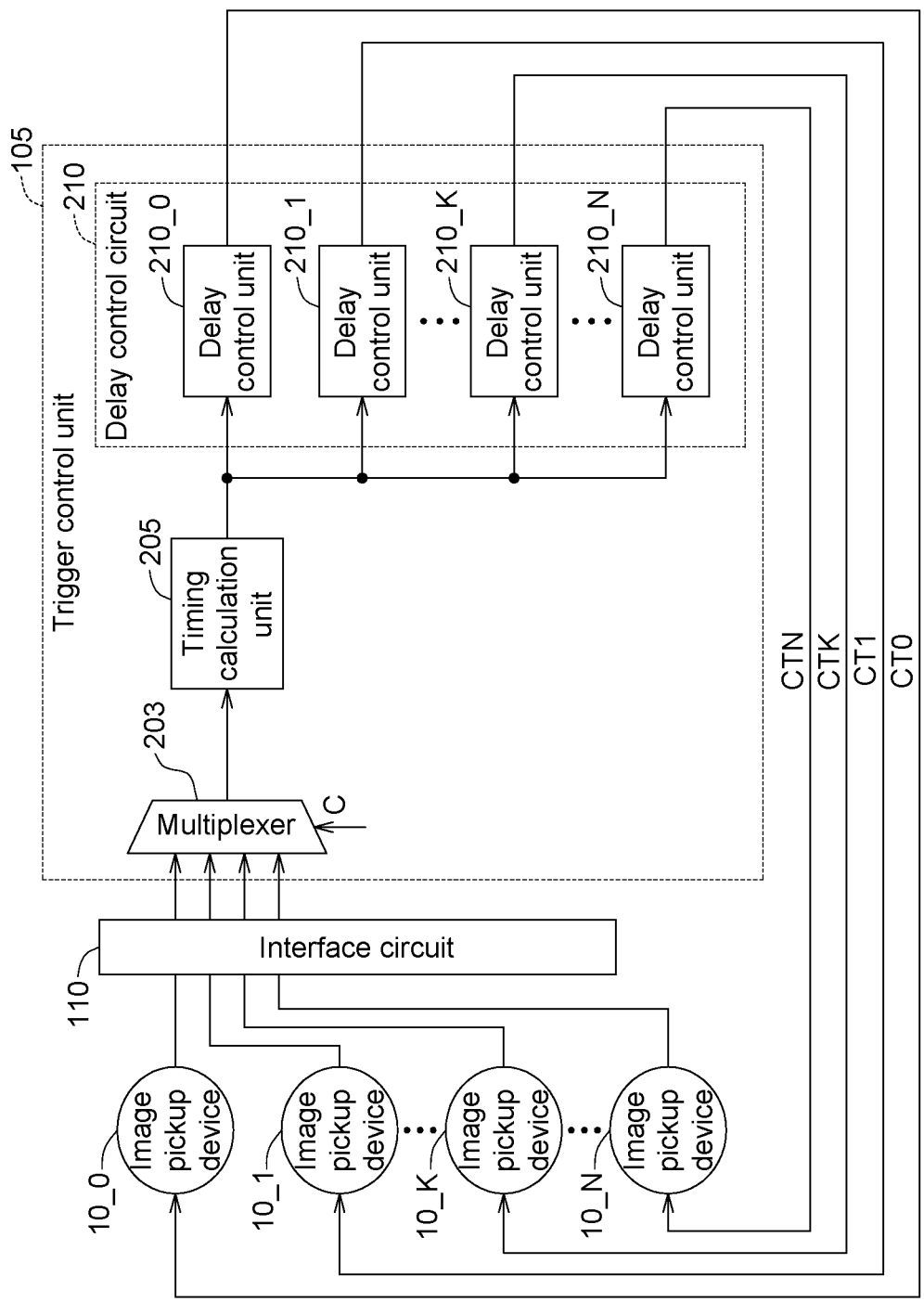
FIG. 2B is a functional block diagram of a trigger control unit according to an embodiment of the present invention.
Figure 2C:
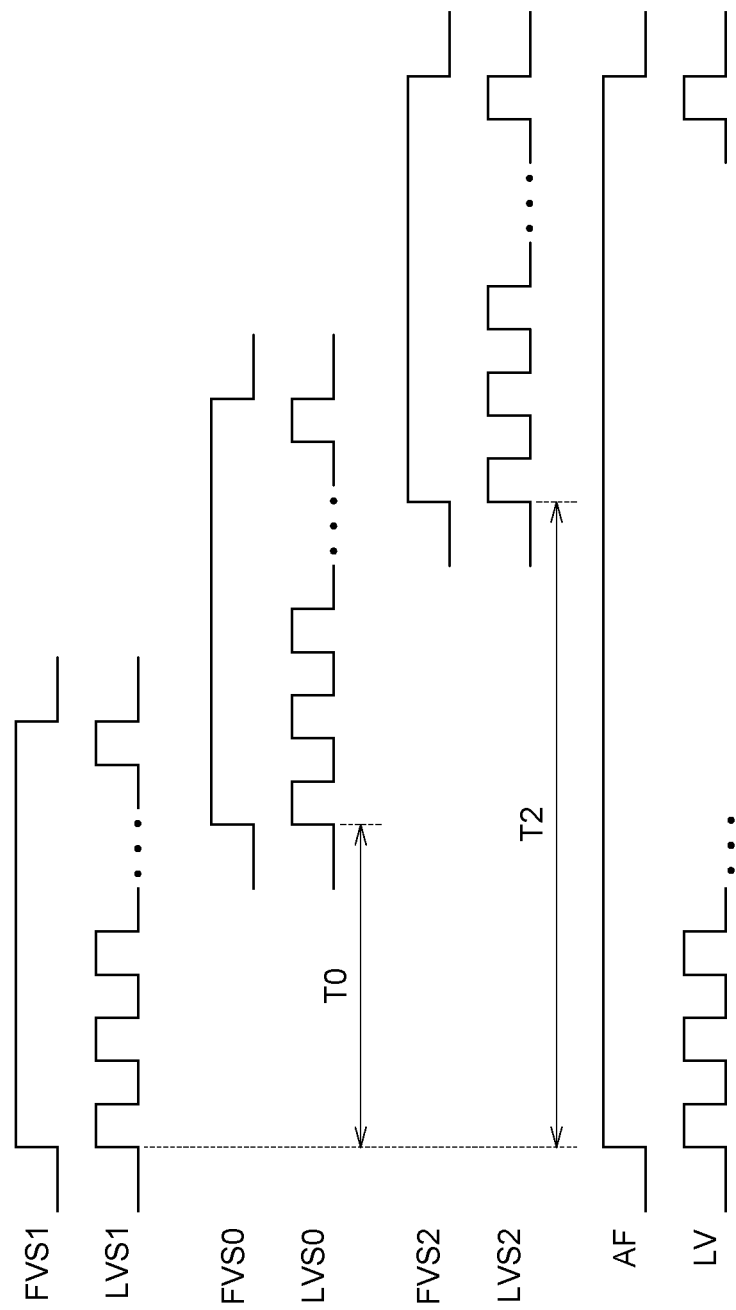
FIG. 2C is a signal waveform of a trigger control unit according to an embodiment of the present invention.

FIG. 2B is a functional block diagram of a trigger control unit according to an embodiment of the present invention. FIG. 2C is a signal waveform of a trigger control unit according to an embodiment of the present invention.

The trigger control unit 105 includes a multiplexer 203, a timing calculation unit 205 and a delay control unit 210. The delay control unit 210 includes a plurality of delay control units 210_0~210_N.

The multiplexer 203 is coupled to the interfaces 110_0~110_N of the interface circuit 110. According to the control signal C (can be determined by the user), the multiplexer 203 selects one of the image pickup devices 10_0~10_N as a reference image pickup device and sends the sync signal of the reference image pickup device (such as a horizontal sync signal) to the timing calculation unit 205.

The timing calculation unit 205 performs timing calculation.

The delay control units 210_0~210_N counts individual delay time T0~TN of the image pickup devices 10_0~10_N according to a delay time parameter (defined by the user) and then sends the trigger signals CT0~CTN to the image pickup devices 10_0~10_N respectively.

Here below, it is exemplified that the retiming unit 140_0 selects the image pickup devices 10_0, 10_1 and 10_2 for image aggregation, but the present invention is not limited thereto.

As indicated in FIG. 2C, suppose the user selects the image pickup device 10_1 as a reference image pickup device, then the image pickup device 10_1 has a delay time T1=0, and the delay control unit 210_1 of the trigger control unit 105 sends a trigger signal CT1 to the image pickup device 10_1. Once the image pickup device 10_1 is triggered, the image pickup device 10_1 sends images to the interface 110_1 of the interface circuit 110. After the interface 110_1 of the interface circuit 110 decodes the images of the image pickup device 10_1, the interface 110_1 of the interface circuit 110 sends a frame valid signal FVS1 (such as a vertical sync signal) and a line valid signal LVS1 (such as a horizontal sync signal) to the multiplexer 203 of the trigger control unit 105; and, the interface 110_1 of the interface circuit 110 sends the video streaming obtained through decoding to the write unit 120_1 of the write circuit 120.

According to the control signal C (determined by the user, in the present example, the control signal C designates the image pickup device 10_1 as a reference image pickup device), the multiplexer 203 sends a frame valid signal FVS1 (such as a vertical sync signal) and a line valid signal LVS1 (such as a horizontal sync signal) to the timing calculation unit 205. The timing calculation unit 205 calculates delay time T0~T2 according to the frame valid signal FVS1 and the line valid signal LVS1.

After delay time T0 (including but not limited to the time for scanning 10 lines), the delay control unit 210_0 of the trigger control unit 105 sends the trigger signal CT0 to the image pickup device 10_0. Once the image pickup device 10_0 is triggered, the image pickup device 10_0 sends images to the interface 110_0 of the interface circuit 110. After the interface 110_0 of the interface circuit 110 decodes the images of the image pickup device 10_0, the interface 110_0 of the interface circuit 110 sends a frame valid signal FVS0 (such as a vertical sync signal) and a line valid signal LVS0 (such as a horizontal sync signal) to the multiplexer 203 of the trigger control unit 105; and, the interface 110_0 of the interface circuit 110 sends the video streaming obtained through decoding to the write unit 120_0 of the write circuit 120.

Similarly, after delay time T2 (including but not limited to the time for scanning 20 lines), the delay control unit 210_2 of the trigger control unit 105 sends a trigger signal CT2 to the image pickup device 10_2. Once the image pickup device 102 is triggered, the image pickup device 10_2 sends images to the interface 110_2 of the interface circuit 110. After the interface 110_2 of the interface circuit 110 decodes the images of the image pickup device 10_2, the interface 110_2 of the interface circuit 110 sends a frame valid signal FVS2 (such as a vertical sync signal) and a line valid signal LVS2 (such as a horizontal sync signal) to the multiplexer 203 of the trigger control unit 105; and, the interface 110_2 of the interface circuit 110 sends the video streaming obtained through decoding to the write unit 120_2 of the write circuit 120.

Moreover, as indicated in FIG. 2C, after the retiming unit 140_0 of the retiming circuit 140 aggregates the pickup images of the image pickup devices 10_0, 10_1 and 10_2 as an aggregated image, the retiming unit 140_0 of the retiming circuit 140 sends an aggregated image frame valid signal AF (such as a vertical sync signal) and an aggregated line valid signal LV (such as a vertical sync signal) to the back-end image processing units 150_0.

To put it in greater details, during the rearrangement, before delay time T0, only the image pickup device 10_1 outputs image data. After delay time T0, the image pickup device 10_0 is triggered, and the image pickup devices 10_1 and 10_0 synchronically output image data. After delay time T2, the image pickup device 10_2 is triggered, and the image pickup devices 10_1, 10_0 and 10_2 synchronically output image data. However, if the frame sizes of the output images of the image pickup devices 10_0, 10_1 and 10_2 are the same, there will be time difference between the output images of the image pickup devices 10_1, 10_0 and 10_2. That is, after the image pickup device 10_1 outputs a complete image, there still has some data left in the image pickup devices 10_0 and 10_2. Therefore, after the image pickup devices have completed the output of images, a complete image can then be rearranged.

In an embodiment of the present invention, the delay time T0~TN can be arranged in an ascending or a descending order and are still within the spirit of the present invention. That is, when one of the image pickup devices is selected as a reference image pickup device, individual delay time of each of other non-reference image pickup devices can be independently determined according to actual needs.

Figure 3:
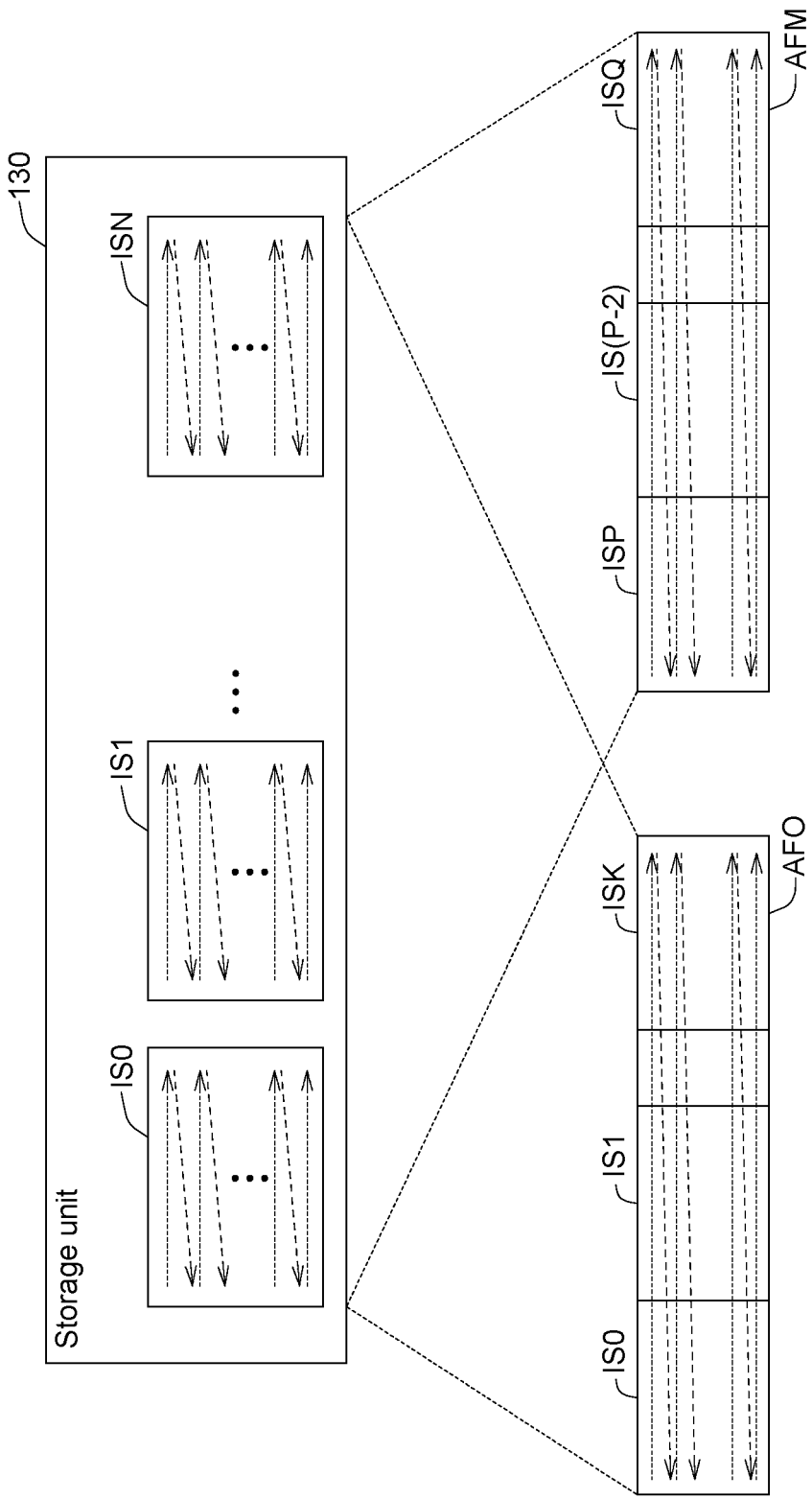
FIG. 3 is a schematic diagram of image aggregation according to an embodiment of the present invention.

FIG. 3 is a schematic diagram of image aggregation according to an embodiment of the present invention. As indicated in FIG. 3, images IS0~ISN stored in the storage unit 130 respectively represent the pickup images of the image pickup devices 10_0~10_N. Here, it is exemplified that the retiming unit 140_0 rearranges the pickup images of the image pickup devices 10_0~10_K (0≤K≤N), and the retiming unit 140_M rearranges the pickup images of the image pickup device 10_P, 10_(P−2), . . . , 10_Q (0≤P, Q≤N), but the present invention is not limited thereto.

As indicated in FIG. 3, during the arrangement, the retiming unit 140_0 rearranges individual first lines of the images IS0~ISK as the first line of an aggregated image AF0, and the rest can be obtained by the same analogy until the retiming unit 140_0 rearranges the images IS0~ISK as a complete aggregated image AF0. Similarly, during the arrangement, the retiming unit 140_M rearranges individual first line of the images ISP, IS(P−2), . . . , ISQ as the first line of an aggregated image AFM, and the rest can be obtained by the same analogy until the retiming unit 140_M rearranges the images ISP, IS (P−2) . . . , ISQ as a complete aggregated image AFM.

Figure 4A:
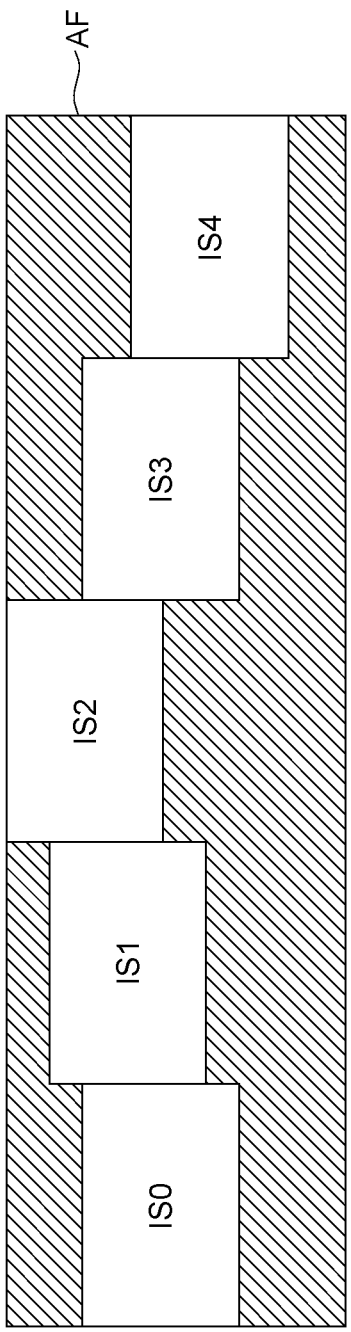
FIG. 4A and FIG. 4B are schematic diagrams of two types of image aggregation according to an embodiment of the present invention.
Figure 4B:
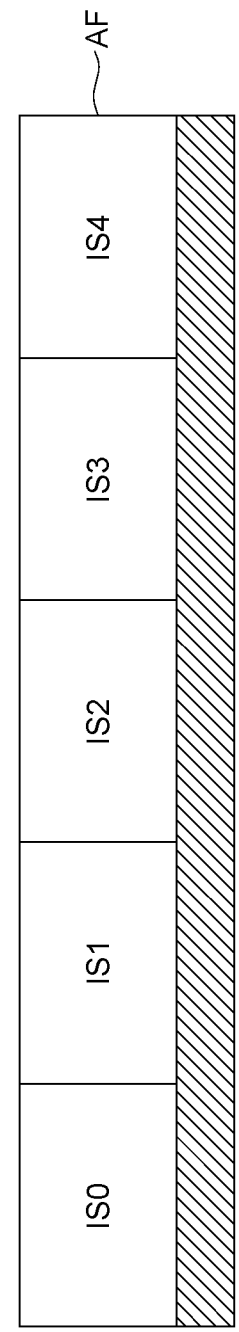
Figure 6A:
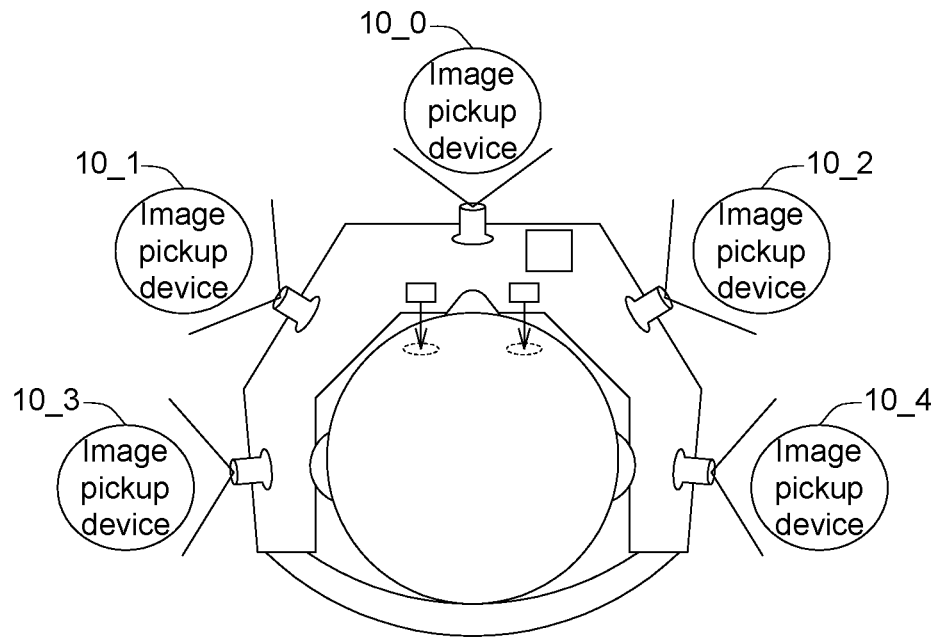
FIG. 6A to FIG. 6D are schematic diagrams of image pickup devices placed at different positions in an embodiment of the present invention.
Figure 6B:
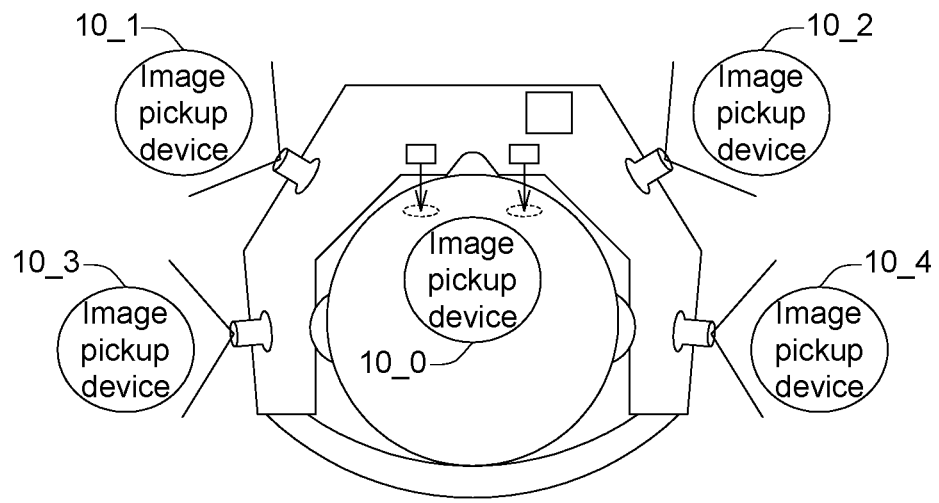
Figure 6C:
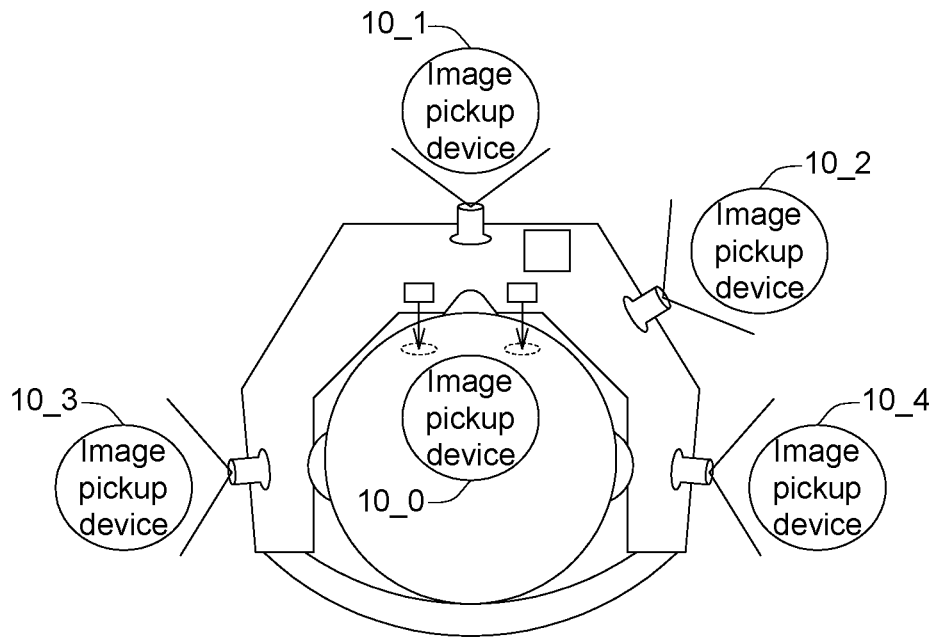
Figure 6D:
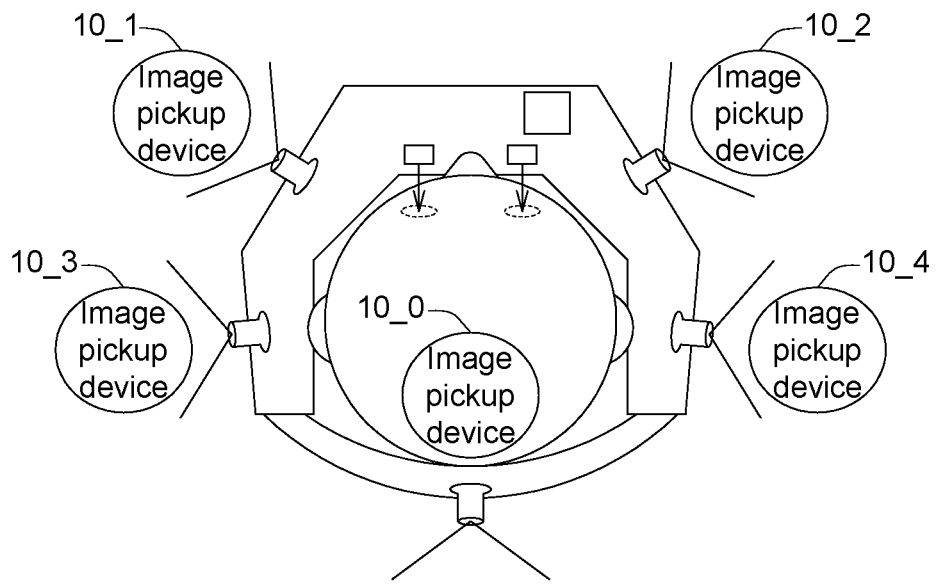

FIG. 4A and FIG. 4B are schematic diagrams of two types of image aggregation according to an embodiment of the present invention. FIG. 4A illustrates a tracking frame mode, and FIG. 4B illustrates a controlling frame mode.

In the tracking frame mode as indicated in FIG. 4A, suppose the pickup sequence is the image pickup devices 102, 10_1, 100, 10_3 and 10_4. That is, the image output timelines of the image pickup devices do not overlap. Furthermore, in an aggregated image, relative positions of the images can be dynamically adjusted and are not limited to a fixed height. The tracking frame mode can be used for tracking dynamic trajectory.

In the controlling frame mode as indicated in FIG. 4B, the output images of the image pickup devices 10_0~10_4 are horizontally placed and are aggregated.

FIG. 5 is an example of image aggregation according to an embodiment of the present invention. As indicated in FIG. 5, the image pickup devices are triggered at different time points to output images to the image aggregation device 100. The image aggregation device 100 aggregate the output images of the image pickup devices to generate an aggregated image AF0.

In an embodiment of the present invention, after several images are aggregated as an image, image processing can be performed subsequently to detect or analyze objects in the image for tracking objects.

FIG. 6A to FIG. 6D are schematic diagrams of image pickup devices 10_0~10_4 placed at different positions in an embodiment of the present invention. In an embodiment of the present invention, the image pickup devices do not have to be placed in a horizontal line or a vertical line. Besides, the image pickup devices can be placed at an arbitrary order. The image pickup devices can be arbitrarily arranged, and the positions are not limited to that exemplified in FIG. 6A to FIG. 6D.

Figure 7:
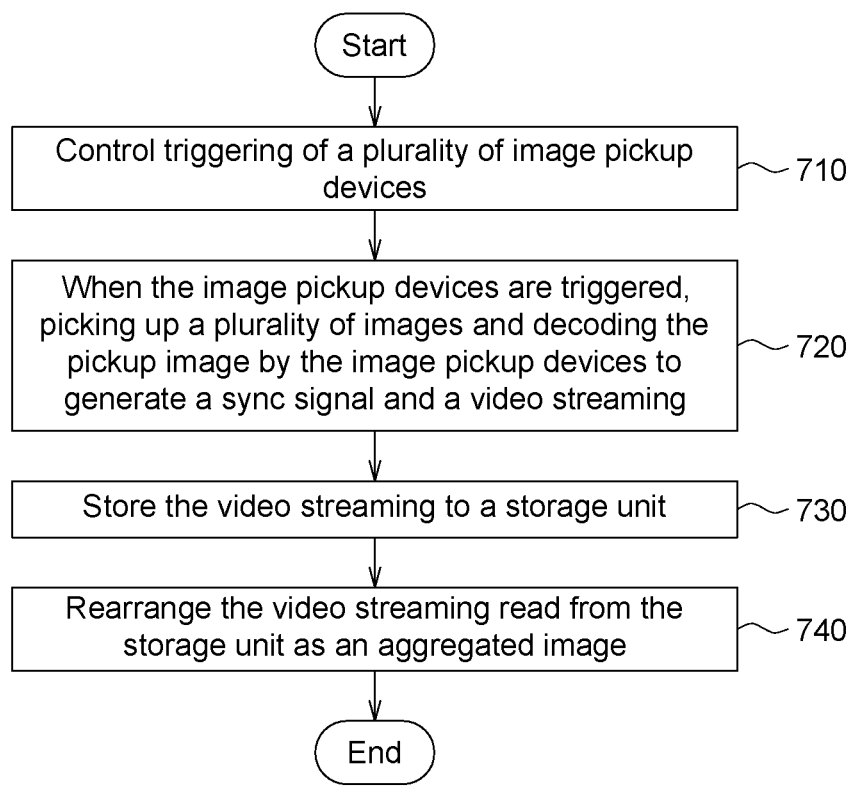
FIG. 7 is a flowchart of an image aggregation method according to an embodiment of the present invention.

FIG. 7 is a flowchart of an image aggregation method according to an embodiment of the present invention. As indicated in FIG. 7, the image aggregation method includes: controlling triggering of a plurality of image pickup devices (710); when the image pickup devices are triggered, picking up a plurality of images and decoding the pickup image by the image pickup devices to generate a sync signal and a video streaming (720); storing the video streaming to a storage unit (730); and rearranging the video streaming read from the storage unit as an aggregated image (740).

Figure 8:
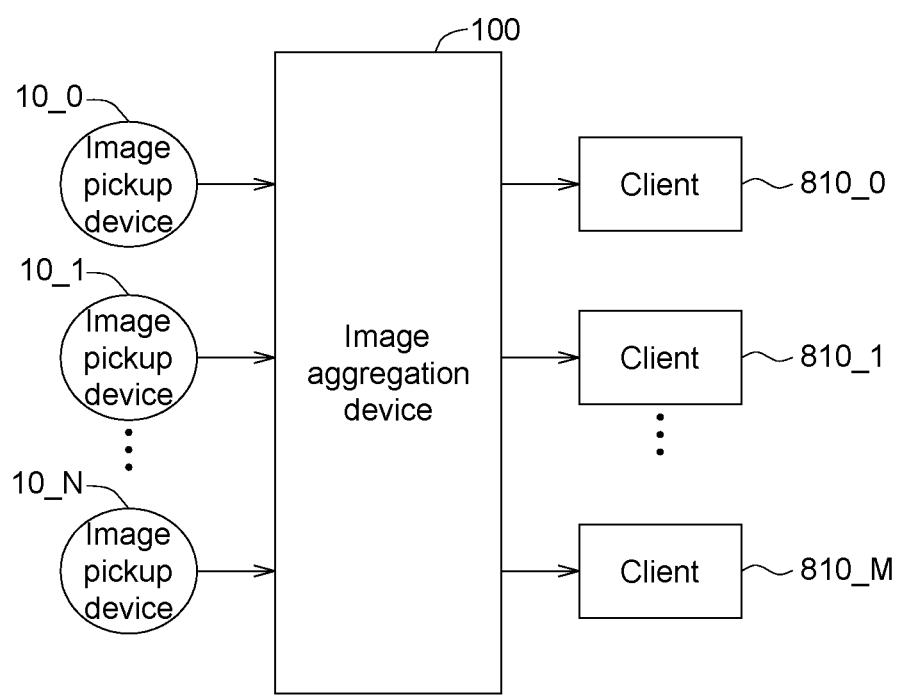
FIG. 8 is a schematic diagram of an image aggregation device used in a monitoring system according to an embodiment of the present invention.

FIG. 8 is a schematic diagram of an image aggregation device used in a monitoring system according to an embodiment of the present invention. As indicated in FIG. 8, each of the clients 810_0~810_M is provided with an image processing unit. Each of the clients 810_0~810_M can configure/set the image aggregation device 100 to arbitrarily select required images from the pickup images of the image pickup devices 10_0~10_M and flexibly aggregate the selected images. The image aggregation device 100 can send the aggregated image to each of the clients 810_0~810_M. As indicated in FIG. 8, the monitoring system using the image aggregation device according to an embodiment of the present invention can dispense with the central server.

In an embodiment of the present invention, a flexible multi-input/multi-output architecture is provided. The multi-input/multi-output architecture can control several image pickup devices to pick up images and further aggregate the pickup images as one or more than one aggregated image and output the aggregated image. To meet the user's needs, the number of the image pickup devices can be expanded and/or the positions of the image pickup device can be adjusted.

In an embodiment of the present invention, the aggregated image has an effective frame rate FPSe=FPSa*D, wherein, FPSa represents the image frame rate of an image pickup device; D represents the number of pickup images that are aggregated as an aggregated image. Moreover, in an embodiment of the present invention, through image aggregation, the effective frame rate of the aggregated images can be increased and the object tracking efficiency can be improved.

In an embodiment of the present invention, the image aggregation device can be used in several application fields including but not limited to monitoring system or head mounted devices with virtual reality/augmented reality (VR/AR) function.

Conventional monitoring system need to be installed with a central server, and therefore incur higher cost. Contrary, the monitoring system using the image aggregation device according to an embodiment of the present invention, in the absence of central server, can process image data and select required images from the pickup images of several image pickup device in a real-time manner, and further send the selected images to the destination. Therefore, the monitoring system using the image aggregation device according to an embodiment of the present invention has the advantage of lower cost.

Moreover, since the number of the image pickup devices of a conventional monitoring system is subjected to the number of channels of the central server, it is not easy to expand the number of the image pickup devices. Contrary, the monitoring system using the image aggregation device according to an embodiment of the present invention can easily and flexibly expand the number of the image pickup devices and/or change the positions of the image pickup devices. Therefore, the monitoring system using the image aggregation device according to an embodiment of the present invention has the advantage of flexible expansion.

When the image aggregation device according to an embodiment of the present invention is used in a head mounted device with AR/VR function, the effective frame rate can be increased and the object tracking function and/or dynamic trajectory detection function can be improved.

Furthermore, when the image aggregation device according to an embodiment of the present invention is used in a head mounted device with AR/VR function, since the aggregated image includes the information of dynamic trajectory, the head mounted device can effectively detect the moving path of the object and predict the direction of the motion of the head or object according to the tracked trajectory and can extract and display the image of the said direction in advance. Thus, the user will not view delayed image and feel dizzy.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic system, comprising:
   a plurality of image pickup devices; and
   an image aggregation device coupled to the image pickup devices for controlling triggering of the image pickup devices, wherein when the image pickup devices are triggered, the image pickup devices pick up and send a plurality of images to the image aggregation device, the image aggregation device flexibly selects required images from the pickup images of the image pickup devices and flexibly rearranges the selected images as an aggregated image by dynamically adjusting relative positions of the selected images,
   wherein the image aggregation device decodes the pickup images of the image pickup devices to generate a sync signal and a video streaming, and rearranges the video streaming as the aggregated image based on the sync signal.

2. The electronic system according to claim 1, wherein, the image aggregation device flexibly and repeatedly uses the pickup images of the image pickup devices according to a size of an internal buffer.

3. The electronic system according to claim 1, wherein, the image aggregation device comprises:
   a trigger control unit coupled to the image pickup devices for controlling triggering of the image pickup devices;
   an interface circuit coupled to the image pickup devices and the trigger control unit, wherein when the image pickup devices are triggered, the pickup images of the image pickup devices are sent to the interface circuit, the interface circuit decodes the pickup images of the image pickup devices to generate the sync signal and the video streaming and further sends the sync signal to the trigger control unit;
   a write circuit coupled to the interface circuit for receiving the video streaming obtained by the interface circuit through decoding;
   a storage unit coupled to the write circuit for storing the video streaming written by the write circuit; and
   a retiming circuit coupled to the storage unit for flexibly rearranging the video streaming read from the storage unit as the aggregated image.

4. The electronic system according to claim 3, wherein, the interface circuit adjusts a frame size of the images.

5. The electronic system according to claim 3, wherein, the write circuit writes the video streaming to the storage unit according to a raster scan sequence.

6. The electronic system according to claim 3, wherein, the storage unit comprises a plurality of line buffers or a frame buffer;
   wherein, when the storage unit comprises the line buffers, a size of the storage unit is relevant to a number of the image pickup devices, an image width of the pickup image and the image pixel bit number of the pickup image.

7. The electronic system according to claim 3, wherein, the retiming circuit comprises a plurality of retiming units each comprising a storage control unit, a read unit and a frame control unit,
   wherein, when an image data of the storage unit is ready, the storage control unit notifies the read unit to read the storage unit according to a scheduling queue parameter set by the user; the scheduling queue parameter flexibly selects images from the pickup images of the image pickup devices for image aggregation, and flexibly designates an image aggregation sequence.

8. The electronic system according to claim 7, wherein, in response to notification of the storage control unit, the read unit reads the video streaming from the storage unit and sends the video streaming to the storage control unit; and
   the storage control unit sends the video streaming to the frame control unit; and
   the frame control unit flexibly rearranges the video streaming received from the storage control unit to generate the aggregated image.

9. The electronic system according to claim 3, wherein, the trigger control unit generates a plurality of trigger signals to the image pickup devices for controlling the image pickup of the image pickup devices and an image output timing, wherein the trigger signals of the image pickup devices are mutually independent.

10. The electronic system according to claim 3, wherein, the trigger control unit selects one of the image pickup devices as a reference image pickup device, and triggering of each of other non-reference image pickup devices of the image pickup devices is delayed in comparison to triggering of the reference image pickup device.

11. The electronic system according to claim 10, wherein,
the trigger control unit comprises a multiplexer, a timing calculation unit and a delay control unit, the delay control unit comprises a plurality of delay control units;
the multiplexer is coupled to the interface circuit for sending the sync signal of the reference image pickup device to the timing calculation unit;
the timing calculation unit performs timing calculation; and
the delay control units count individual delay time of each of the image pickup devices to trigger the image pickup devices according to a delay time parameter.

12. An image aggregation method, comprising:
controlling triggering of a plurality of image pickup devices;
when the image pickup devices are triggered, picking up a plurality of images by the image pickup devices; and
flexibly selecting required images from the pickup images of the image pickup devices and flexibly rearranging the selected images as an aggregated image by dynamically adjusting relative positions of the selected images,
wherein the image aggregation device decodes the pickup images of the image pickup devices to generate a sync signal and a video streaming, and rearranges the video streaming as the aggregated image based on the sync signal.

13. The image aggregation method according to claim 12, further comprising: flexibly and repeatedly using the pickup images of the image pickup devices according to a size of an internal buffer.

14. The image aggregation method according to claim 12, wherein,
the pickup images of the image pickup devices are decoded to generate the sync signal and the video streaming;
storing the video streaming to a storage unit; and
rearranging the video streaming read from the storage unit as an aggregated image.

15. The image aggregation method according to claim 14, further comprising: adjusting a frame size of the images.

16. The image aggregation method according to claim 14, wherein, the video streaming is written to the storage unit according to a raster scan sequence.

17. The image aggregation method according to claim 14, wherein,
the storage unit comprises a plurality of line buffers or a frame buffer;
wherein, when the storage unit comprises the line buffers, a size of the storage unit is relevant to a number of the image pickup devices, an image width of the pickup image and the image pixel bit number of the pickup image.

18. The image aggregation method according to claim 14, wherein, when an image data of the storage unit is ready, the storage unit is read according to a scheduling queue parameter set by the user; the scheduling queue parameter flexibly selects images from the pickup images of the image pickup devices for image aggregation, and flexibly designates an image aggregation sequence.

19. The image aggregation method according to claim 14, wherein, a plurality of trigger signals are generated to the image pickup devices for controlling the image pickup of the image pickup devices and an image output timing, wherein the trigger signals of the image pickup devices are mutually independent.

20. The image aggregation method according to claim 14, wherein, one of the image pickup devices is selected as a reference image pickup device, and triggering of each of other non-reference image pickup devices of the image pickup devices is delayed in comparison to triggering of the reference image pickup device.

21. The image aggregation method according to claim 20, wherein,
timing calculation is performed according to the sync signal of the reference image pickup device; and
individual delay time of each of the image pickup devices is counted to trigger the image pickup devices according to a delay time parameter.

22. An electronic system, comprising:
a plurality of image pickup devices; and
an image aggregation device coupled to the image pickup devices for controlling triggering of the image pickup devices, wherein when the image pickup devices are triggered, the image pickup devices pick up and send a plurality of images to the image aggregation device, the image aggregation device flexibly selects images from the pickup images of the image pickup devices and flexibly rearranges the selected images as one or more than one aggregated image by dynamically adjusting relative positions of the selected images,
wherein the image aggregation device decodes the pickup images of the image pickup devices to generate a sync signal and a video streaming, and rearranges the video streaming as the aggregated image based on the sync signal.

* * * * *